United States Patent [19]

Nourigat

[11] 3,708,790

[45] Jan. 2, 1973

[54] DEVICE FOR WRITING AND READING MAGNETIC TICKETS

[75] Inventor: Gërard Nourigat, Sainte-Genevieve-Des-Bois, France

[73] Assignee: Compagnie Generale D'Automatisme, Paris, France

[22] Filed: Jan. 22, 1971

[21] Appl. No.: 108,744

[30] Foreign Application Priority Data

Jan. 22, 1970 France....................................7002312

[52] U.S. Cl..340/174.1 G, 235/61.12 M, 346/74 MP

[51] Int. Cl.........G11b 3/38, G11b 5/56, G11b 15/08

[58] Field of Search.........101/DIG. 15; 179/100.2 E; 340/174.1 R, 174.1 L, 174.1 G; 346/74 M, 74 MP; 235/61.12 M

[56] References Cited

UNITED STATES PATENTS 3,315,242 4/1967 Haddad...........................179/100.2 E

*Primary Examiner*—Vincent P. Canney

*Attorney*—Craig, Antonelli, Stewart & Hill

[57] ABSTRACT

Device for recording data on or reading data from a magnetic ticket wherein a movable ticket carrier having a data detector mounted thereon is positioned for guided movement relative to a magnetic head and a member carrying coded data so that as the ticket on the carrier is moved past the magnetic head, the data detector moves past corresponding portions of the coded data member. With the magnetic head used as a recording means, the data detector is connected thereto through an amplifier. With the magnetic head used as a reader, the data detector and the magnetic head are connected to a comparator to detect correspondence between the data recorded on the ticket and the data on the data member.

15 Claims, 6 Drawing Figures

FIG.1
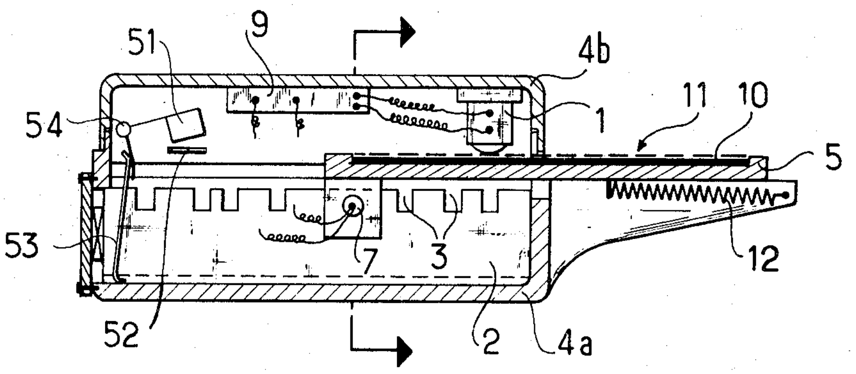
FIG.4
FIG.2
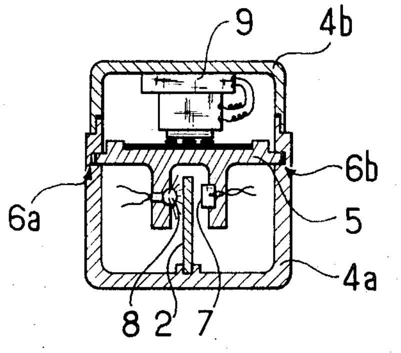
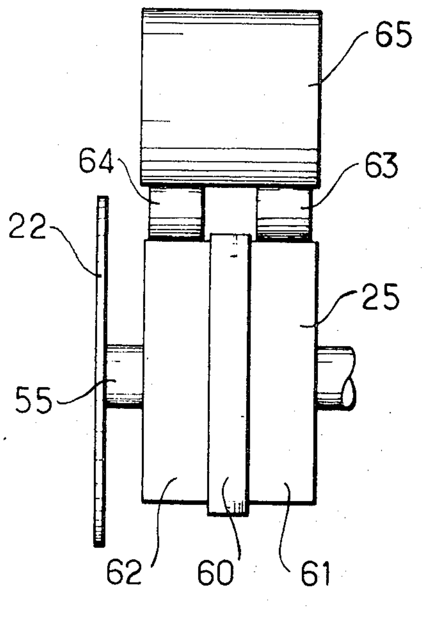

DEVICE FOR WRITING AND READING MAGNETIC TICKETS

The present invention relates to the writing and/or reading of coded data, or other information, on tickets, notes, or the like provided with at least one magnetic tract.

Numerous devices exist in this field and they are generally distinguished from each other by virtue of the mechanical elements constituting them. The principle of reading and/or writing a magnetic ticket used to date consists in causing the magnetic track to pass in front of a recording or reading cell which emits or receives a coded binary information, this information resulting from the succession in time of a series of binary conditions. For the purpose of ensuring perfect operation, this principle requires that the speed of passage or movement of the ticket in front of the recording or reading cell be essentially constant and excludes any return in the reverse direction, particularly of an accidental nature, during the reading or writing operation. This constitutes a serious drawback, particularly in the case of an apparatus which is operated manually, since an error or only a momentary hesitation on the part of the operator is always possible.

In order to obviate the above-mentioned drawback, it is the object of the present invention to provide a device in which the function of time of movement of the magnetic track with respect to the reading or writing cell may be as desired, and in particular, may include stops and/or returns in the reverse direction.

The present invention is directed to a device for the transmission of coded information with a view toward permitting the use of a ticket equipped with at least one magnetic track, characterized in that it comprises a first member including at least one magnetic head, a second member for receiving and positioning said ticket opposite to said first member, and first drive means for guiding movement of said second member with respect to said first member, an element carrying coded data, a reader of said data, and second drive means for guiding movement of said element carrying data with respect to said reader, means for interconnecting said first and second drive means, so as to coordinate the relative movement of said first and second members with respect to said element carrying data and said reader, and an electronic circuit connected, on the one hand, to said reader, and on the other hand, to the magnetic head and/or heads.

In a first embodiment of the present invention, this electronic circuit is an amplifier which receives a signal emitted by said reader and controls the magnetic head which is used as a writing head.

In another embodiment, the electronic circuit is a comparator which receives a first input signal generated by said reader, and a second input signal generated by said magnetic head used as a reading head, and the comparator generates an output signal which is representative of the comparison between said input signals. For example, if this output signal is binary, a first binary state or condition may correspond to a coincidence between said input signals, and a second binary state or condition may correspond to a disparity thereof.

According to a further embodiment of the present invention, this electronic circuit comprises a first circuit portion or channel operating as a comparator between the output signal of said reader and a signal furnished by said magnetic head, said magnetic head being adapted to operate either for writing from the output signal of a second circuit portion or channel operating as an amplifier, or for reading and delivering a signal to said first circuit portion operating as a comparator.

According to still a further embodiment of the present invention, the magnetic head and said element carrying the information, which consists of a plate equipped with perforations, are stationary, while said second member and the reader are mobile and fixed with respect to each other, said first and second drive means being common thereto.

It occurs frequently that the ticket thus provided must carry in addition to the information or data recorded on the magnetic track also data or information which is visually legible, such as a number, a validity mark, an identification of the emitting apparatus, and the like.

According to one characteristic of the device in accordance with this invention, it comprises furthermore imprinting means which serves to imprint on the ticket data which is visually legible.

In one embodiment of the device, the imprinting means is mechanically connected with the element carrying coded data, which — in case of disassembly — advantageously ensures the correspondence between the data to be recorded and the data to be imprinted.

The present invention will be better understood upon studying the particular embodiments described in detail hereinafter, in connection with the accompanying drawings, wherein:

FIG. 1 is a longitudinal cross-sectional view of a device in accordance with the present invention;

FIG. 2 is a transverse cross-sectional view of the device of FIG. 1;

FIG. 4 is an end view of the device shown in FIG. 3;

Figure 3:
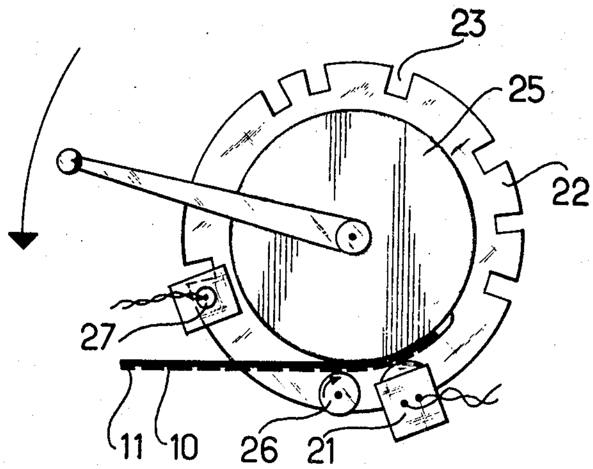
FIG. 3 is a schematic view of a device having a circular driving movement.

The device shown in FIGS. 1 and 2 comprises a magnetic head 1 and a plate 2 carrying coded data in the form of perforations, such as perforation 3; the magnetic head 1 and the plate 2 are fixed to a box or casing 4*a* – 4*b* so as to be stationary with respect to each other. A support 5 is displaced along guides 6*a* and 6*b* in the sides of box 4*a*. The information or data reader is a photo-sensitive element 7, such as photo-transistor, which is mounted on the support 5, and a luminous source 8 is disposed opposite thereto. An electronic circuit 9 is connected on the one hand to the photo-sensitive element 7 and, on the other hand, to the magnetic head 1. The ticket 10 equipped with a magnetic track 11 will be placed on the platform or support 5 with respect to which it is accurately positioned.

In a first embodiment, the electronic circuit 9 is provided in the form of an amplifier which receives a signal from the photo-sensitive element 7 and applies an excitation current to the magnetic head 1, which operates as a writing head. Hence, each time the photo-sensitive element 7 passes by a perforation 3, the magnetic head 1 will magnetize the portion of the track 11 of the ticket 10 which is disposed opposite thereto.

In operation thereof, the platform or support 5 is pulled out, the operator places the ticket 10 therein and pushes the unit in. The track 11 therefore will pass or move by under the head 1 while at the same time the photo-sensitive element 7 is displaced along the perforations 3. In this manner, and irrespective of the manner of movement of the platform or support 5 between the two extreme positions thereof, the track 11 will receive information that corresponds precisely to that constituted by the perforations 3 in the plate 2. In fact, if a slight return movement toward the rear is produced, the information already recorded will not be disturbed because what will be re-read on the plate 2 will exactly correspond to the data already recorded at the same place on the track 11.

The return of the support 5 to the initial outside position is assured by means of the spring 12. The manual control and possibly the action of the spring may be replaced by a mechanical driving arrangement, particularly in an automatic device.

In another embodiment, the electronic circuit 9 is provided in the form of a comparator which receives at a first input a signal from the photo-sensitive element 7 and at a second input a signal from the magnetic head 1 operating as a reading head, the magnetic track 11 on the ticket 10 already being provided with a coded magnetic information. These two signals are compared so as to detect any disparity between corresponding portions of the same. The coincidence which is sought by the comparator is based upon the coordinated movement of the platform 5 and element 7 so that in the course of the displacement of the platform or support 5, the photosensitive element 7 encounters a perforation 3 at the same time that the head 1 detects a zone magnetized by the track 11, and vice versa. When the comparator detects coincidence between the data recorded on the ticket or card and that provided by the plate 2, a signal is generated which may operate an indicator showing acceptance or approval of the ticket. If a disparity is detected, the output of the comparator would indicate rejection of the ticket.

For the purpose of imprinting visible data on the ticket 10, the device advantageously further includes a hammer 51 supporting one or more imprinted characters or symbols, which hammer pivots on an axle 54 when actuated and is returned to its rest position by means of a spring 53, as has been shown in FIG. 1. This hammer, which is actuated by the platform or support 5 at the end of the course of movement thereof, imprints its characters upon the ticket by pressing down upon an inked band 52.

In a modified embodiment of this arrangement which has not been shown herein, the hammer may be actuated by a key or push-button engaged at the end of the stroke of the platform or support 5, in which case the hammer will imprint its characters upon the ticket by a striking of the hammer and of the inking band on the ticket.

Numerous other devices may be made on the basis of the one which has been described above. For example, FIGS. 3 and 4 illustrate one embodiment in which the movement of the ticket is circular instead of being rectilinear. The ticket 10 is driven or moved by a mobile rotating drum 25, one or several rollers 26 holding it in position. Thus, the magnetic track 11 passes or moves in front of the fixed magnetic head 21 whereas the circular plate 22 equipped with perforations 23 which is secured to the drum 25 is displaced simultaneously with respect to the photo-sensitive element 27 mounted on a fixed support. The circular plate 22 may also be connected to the drum 25 by gear means producing movement of the two elements in a prescribed ratio.

The means for imprinting visible information or data that is legible consists in this embodiment of the cylindrical portions 61 and 62 carrying characters or symbols in relief, and these cylindrical portions 61 and 62 are part of the drum 25. In FIG. 4, the characters in relief have not been shown. The drum 25 advantageously comprises, as illustrated, a band 60 not carrying characters and disposed in the median cylindrical portion of the drum 25, which portion effects the driving of the ticket 10 by friction.

The portions 61 and 62 each cooperate with at least one inking roller 63, 64 and an inking reservoir 65 for imprinting upon the ticket 10 the engraved characters at the same time as the magnetic head 21 records (or reads) on the magnetic track 11 of the ticket 10, which is driven by the drum 25, the signals defined by the disk 22 driven at a speed ratio which is maintained constant before its reader 27.

The cylindrical portions 61 and 62 may consist of two cylinders having essentially the same diameter as the drum 25, which consists solely of the portion covered by the band 60, and the cylinders 61 and 62 are essentially located on both sides of the drum 25 and driven by the same axle 55. In a modified embodiment it is likewise possible that only one of the cylindrical portions 61 and 62 carries characters in relief and is associated with at least one inking roller.

For a device corresponding to FIGS. 1 and 2, a change in information implies the replacement of the plate 2 by another plate equipped with perforations which are distributed differently. Equally, for a device such as shown in FIGS. 3 and 4, it will be necessary to change the circular plate 22.

Figure 5:
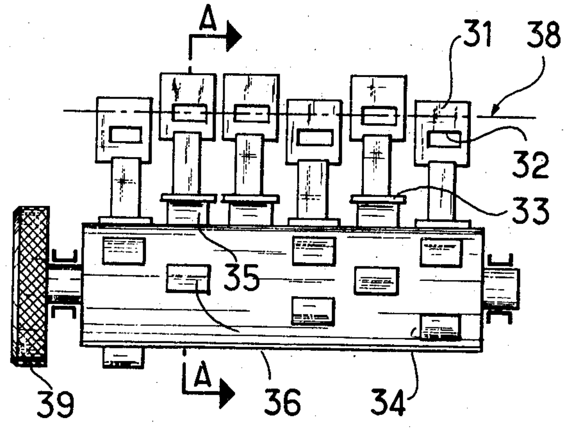
FIG. 5 represents schematically in a longitudinal cross-sectional view a modified form of the element carrying the information.
Figure 6:
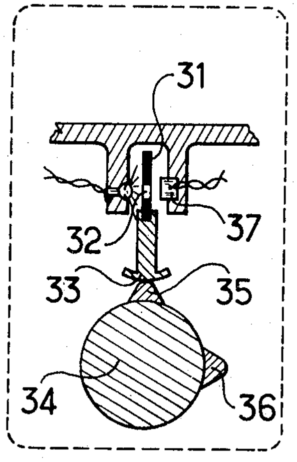
FIG. 6 is a cross-sectional view taken along line A—A of FIG. 5.

In a modified embodiment of the invention, the interchangeable plate 2 is replaced by a system such as shown in FIGS. 5 and 6. A plurality of plates 31 mounted side by side, each includes a perforation 32, for example in the lower half thereof. The plates rest with their lower end 33 upon a cam cylinder 34. A plurality of cams, such as 35 or 36, selectively shift the corresponding plates with respect to those which rest on the cylinder as the cylinder is turned. The cams serve to guide the plates 31 to data positions in a selective manner and render it possible in this way to obtain different relative orientations of the plates 31 so as to define distinct data combinations. The detector 37, which is displaced at the line 38 in the manner illustrated in FIG. 6, will thus scan, for each relative positioning of the plates 31, along the plain parts of the plates which are in the lower position (being supported on the cylinder) and along the perforations 32 of the plates which are in the higher position (being supported on a cam), thereby generating a coded information signal. Each combination of cams disposed on the same generatrix constitutes an information; and this information may be selected by the action of the operator in rotating the small tracing wheel 39 which is secured to the cylinder 34.

A device such as proposed by the present invention is particulary suitable for either the distribution in series or the control of tickets, for example transportation tickets. A coded information is carried on the ticket at the moment it is bought, this information being the reproduction of a specific plate. This information is then decoded and compared with that of a plate identical to the preceding one, and the correspondence of the two informations or data attest to the validity of the ticket. The information which is legible in writing on the ticket may be an identification number, and/or a date, and/or the cost of the service corresponding to the ticket.

The present invention is not limited to the embodiments previously described, and it is quite permissible to replace all of the means disclosed herein by equivalent means without departing from the spirit and scope of the present invention.

What is claimed is:

1. A device for the transmission of coded information in connection with a ticket equipped with at least one magnetic track, comprising a first member including at least one magnetic head, a second member for receiving and positioning said ticket opposite said first member, and first means for effecting relative movement between said second member and said first member, an element carrying coded data, a reader of said data, and second means for effecting relative movement between said element carrying data and said reader, means for interconnecting said first and second drive means so as to coordinate the relative movement of said first and second members with respect to the relative movement of said element carrying data and said reader, and an electronic circuit connected to said reader and to said magnetic head.

2. A device according to claim 1, further including means for imprinting at least one visible information which is legible in plain writing on said ticket, said means being actuated in response to operation of said first means.

3. In a device for the transmission of coded information for use with a ticket equipped with at least one magnetic track, the improvement comprising at least one magnetic head and a support member for receiving and positioning said ticket opposite said magnetic head, one of the members comprising said magnetic head and said support member being mounted for movement relative to the other, an element carrying coded data and a reader of said coded data, one of the members comprising said coded data element and said reader being mounted for movement relative to the other, the movable members being interconnected so as to be moved in a coordinate manner.

4. A device according to claim 3, wherein said support member is a rotatable drum and said element carrying data is a disk equipped with perforations connected in rotation with said drum, said reader and said magnetic head being stationary.

5. A device according to claim 4, further including means for imprinting upon said ticket at least one information which is legible in plain writing, consisting of at least one cylinder carrying imprinting characters, said cylinder being part of said rotating drum and at least one inking roller in contact with said cylinder.

6. The combination defined in claim 3, further including electronic circuit means connected to said reader and said magnetic head for controlling the operation of said magnetic head.

7. A device according to claim 6, wherein said electronic circuit is an amplifier receiving a signal from said reader and providing an amplified output to said magnetic head, which is utilized as writing head.

8. The combination defined in claim 3, further including electronic circuit means connected to said reader and said magnetic head for receiving the respective outputs thereof.

9. A device according to claim 8, wherein said electronic circuit is a comparator circuit which receives a first input signal from said reader and a second input signal from said magnetic head, which is utilized as a writing head, the output signal from said comparator circuit being representative of the comparison between said input signals.

10. A device according to claim 3, wherein said element carrying data comprises a plurality of plates each equipped with at least one opaque zone and at least one transparent zone including a perforation, and means for selectively positioning said plates with respect to the trajectory of said data reader in a manner such that said trajectory encounters either said plain zone or said transparent zone of each plate, the combination of the positions of said plates constituting a data combination.

11. A device according to claim 10, wherein said means for selectively positioning said plates comprises a plurality of cams mounted on a common axle for supporting said plates.

12. A device according to claim 3, further including an electronic circuit comprising a first circuit portion providing an amplifier having its input connected to said reader and a second circuit portion having a comparator connected between said reader and said magnetic head, and means for selectively enabling said first circuit portion or said second circuit portion so that said device may be used either for writing on the basis of the output signal of said amplifier, or for reading and delivering a data signal to said comparator.

13. A device according to claim 3, wherein said magnetic head and said element carrying data are stationary, said support member and said reader are mobile and connected to each other.

14. A device according to claim 13, further including means for imprinting upon said ticket at least one information which is legible in plain writing, consisting of a pivotable hammer carrying imprinting characters which is mechanically connected to said element carrying coded data and actuated in rotation by means of said second member in response to operation of said support member and said reader.

15. A device according to claim 13, wherein said element carrying data consists of a plate equipped with perforations.

* * * * *